March 14, 1961 R. B. RICE 2,974,743
METHOD OF SEISMIC PROSPECTING
Filed Sept. 15, 1953 4 Sheets-Sheet 2

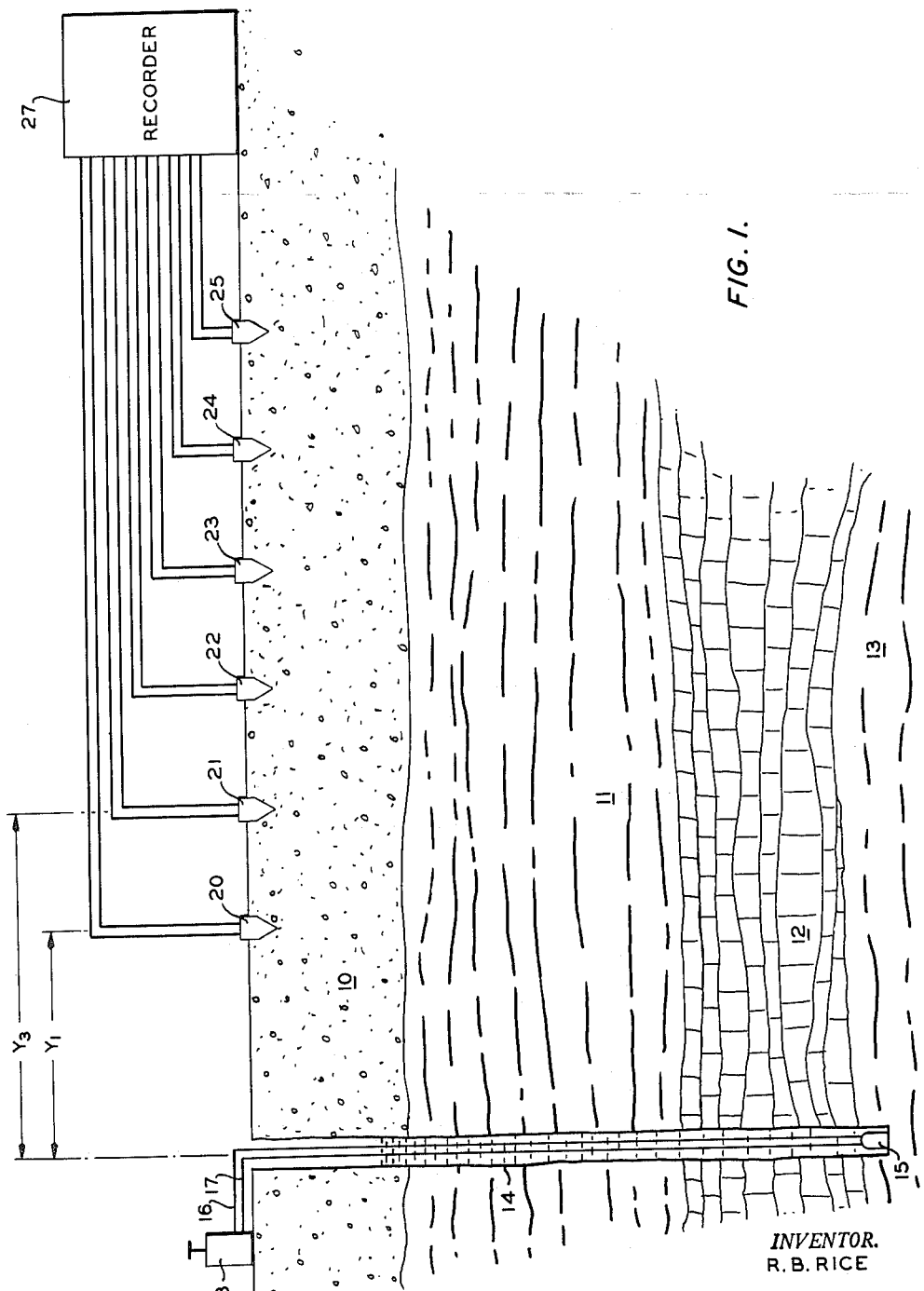

INVENTOR.
R. B. RICE
BY Hudson & Young
ATTORNEYS

March 14, 1961 R. B. RICE 2,974,743
METHOD OF SEISMIC PROSPECTING
Filed Sept. 15, 1953 4 Sheets-Sheet 4

INVENTOR.
R. B. RICE
BY Hudson & Young
ATTORNEYS

United States Patent Office 2,974,743
Patented Mar. 14, 1961

2,974,743
METHOD OF SEISMIC PROSPECTING

Robert B. Rice, Bartlesville, Okla., assignor to Phillips Petroleum Company, a corporation of Delaware Filed Sept. 15, 1953, Ser. No. 380,320

6 Claims. (Cl. 181—.5)

This invention relates to seismic prospecting. In another aspect it relates to a method of seismic prospecting which is particularly useful in regions having a layer of material positioned at or near the earth's surface which has high velocity vibration transmission properties.

Seismic prospecting, as is well known to those skilled in the art, is a procedure through which information regarding subsurface geological strata is obtained. An explosive charge is detonated at or near the surface of the earth to provide vibrations which are transmitted downwardly into the lower formations. These vibrations are reflected and refracted as they pass through zones which transmit vibrations at different velocities. The reflected vibrations subsequently are detected at the surface by a plurality of vibration responsive devices disposed in a predetermined geometric array to provide an indication of the times of arrival of selected vibration patterns at the several vibration responsive devices. Valuable information can be obtained in this manner regarding the subsurface formations, this information being particularly useful in oil prospecting.

In most of the areas where seismograph records obtained by the conventional exploration methods are poor or not usable, it has been found that the formations have one characteristic in common, namely, a bed at or below the surface which transmits vibrations at a high velocity. For example, in the Panhandle of Oklahoma and Texas there is the Blaine formation which is composed primarily of hard gyp or anhydrite which transmits vibrations at a velocity of approximately 14,000 feet per second. The media above and below this Blaine formation transmits vibrations at velocities in the range of approximately 7,000 to 9,000 feet per second. The Blaine formation is generally several hundred feet thick and the top of it may occur at a depth below the earth's surface from 200 to over 1,000 feet. In much of West Texas there is a hard caliche or gyp varying in thickness from a few feet to several hundred feet and which is located at or at various depths below the surface. In the Edwards plateau area in Southwest Texas there exists the Edwards lime which is generally 800 feet or more thick and which transmits vibrations at velocities of approximately 8,500 to 12,000 feet per second. This latter formation is at or very near the surface.

The velocity contrasts at the top, which is the surface of the ground in some instances, and at the bottom of all the above-mentioned high-velocity beds are sufficiently large to give relatively high reflection coefficients. Therefore, a sizable portion o fthe energy from an explosive charge fired above or within these beds is reflected back from the top or bottom of these beds (or both) one or more times and causes directly or indirectly interference with the desired reflections. In the Edwards plateau area as many as twelve multiple reflections back and forth between base and top of the Edwards lime have been clearly identified.

It is toward providing an improved method of seismic prospecting which can be used in areas having formations of the above-mentioned type that the present invention is primarily directed.

Accordingly, it is an object of the present invention to provide an improved method of seismic prospecting that is particularly useful in areas which are characterized by formations positioned at or near the surface of the earth which have high velocity vibration transmitting properties.

Another object is to provide an improved method of positioning an explosive charge for seismic surveying in areas having the above-mentioned type of formations.

The seismic prospecting method of this invention comprises, generally, drilling a relatively deep shot hole to a depth slightly below the bottom surface of a formation having high velocity vibration transmission properties. A sizable charge of explosive material is positioned at the bottom of such a shot hole and detonated. The resulting seismic waves are detected and recorded at the surface of the earth by a plurality of geophones positioned in a predetermined geometric array.

Various other objects, advantages and features of this invention should become apparent from the following detailed description taken in conjunction with the accompanying drawing in which:

Figure 1 is a schematic view of a cross-section of the earth showing suitable apparatus to carry out the seismic prospecting method of this invention;

Figure 4:
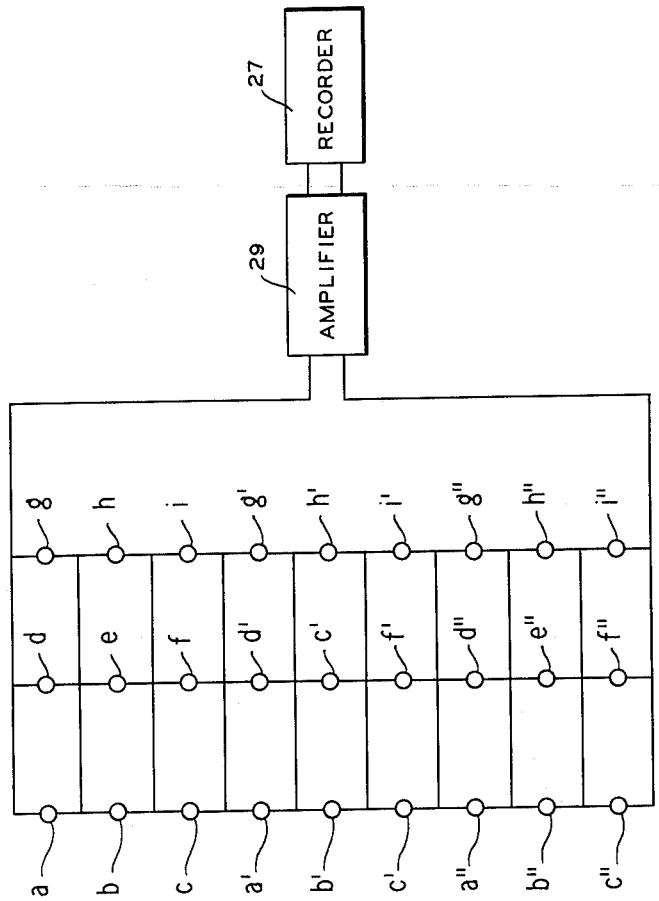
Figure 4 is a schematic circuit diagram of a portion of the geophone recording system.

Referring now to the drawing in detail and to Figure 1 in particular, there is shown a schematic representation of the upper earth formations which exist, for example, in the Oklahoma and Texas Panhandle. An unconsolidated or weathered bed 10 is located immediately below the surface of the earth. Below this bed there exists a consolidated bed 11, and below bed 11 there exists a bed 12 of hard material having high velocity vibration transmission properties. The vibration transmission velocity in bed 12 is greater than the corresponding transmission velocity in either bed 11 or in the bed 13 positioned below bed 12. In conventional seismic prospecting, an explosive charge, not shown, is positioned in a shot hole in either bed 10 or bed 11. However, in this conventional method of shooting, high velocity bed 12 acts as a sounding board to reflect a sizeable portion of the vibrations traveling downwardly from the explosive charge back to the surface or near the surface where such vibrations again may be reflected or converted into other extraneous vibrations. In accordance with the present invention, a shot hole 14 is drilled to a depth slightly greater than the lower surface of high velocity bed 12. The position of this lower boundary can readily be determined from an examination of the cuttings removed during the drilling of shot hole 14 or from a log of the hole. An explosive charge 15 is positioned in shot hole 14 slightly below the lower surface of bed 12 and connected by leads such as 16 and 17 to a detonator 18 positioned at the surface of the earth. Charge 15 normally is tamped by a column of water in shot hole 14 which tends to direct the resulting vibrations downwardly. At the depths to which shot hole 14 is drilled in accordance with this invention water normally is present in the hole. A plurality of groups of geophones such as 20, 21, 22, 23, 24 and 25 is disposed at or near the surface of the earth in a predetermined geometric array. These geophones are connected to a conventional recorder unit 27 which can include an amplifier and a photographic recorder associated with each individual geophone group.

Figure 2:
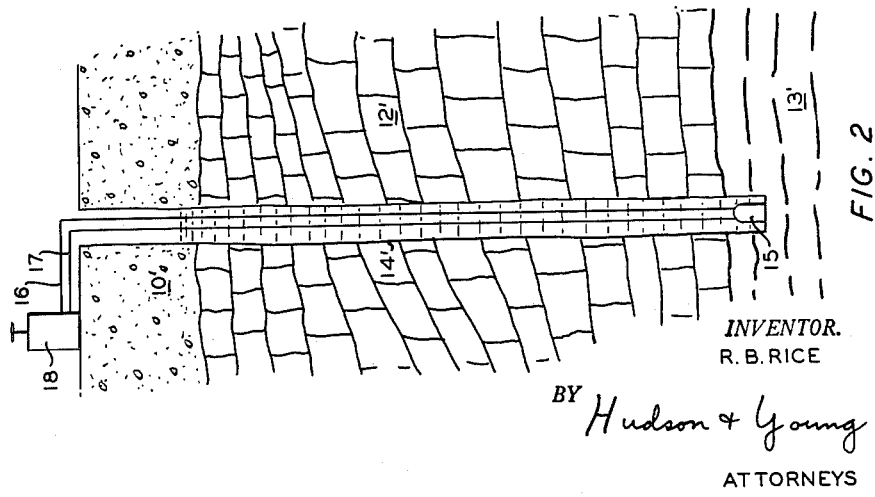
Figure 2 illustrates a second type of earth formation wherein the seismic prospecting method of the present invention is useful.

In Figure 2 there is illustrated a schematic representation of the upper strata which exists on the Edwards plateau. In this area the high velocity bed 12' is positioned directly under the unconsolidated or weathered surface bed 10'. A shot hole 14' is drilled into bed 13' to a depth slightly greater than the lower surface of high velocity bed 12'. In the seismic prospecting methods practiced heretofore a charge, not shown, generally is detonated within bed 12. This has caused multiple reflections between the base and the top of high velocity bed 12' or between the base of bed 12' and the surface of the earth. In accordance with the method of the present invention charge 15 is positioned immediately below bed 12' such that most of the vibrational energy resulting from the detonation of charge 15 is directed downwardly toward the lower formations of interest.

In practicing the present invention it is desired that explosive charge 15 be positioned in close proximity to the lower surface of the high velocity bed so that the vibrations initially traveling downwardly are not interfered with by vibrations which initially travel upwardly from the shot and are reflected downwardly from the lower surface of the high velocity bed. Even if the shot were fired within bed 12 but far enough below the surface of bed 12 so that the energy reflected from the surface did not destructively interfere with the original downward vibrations, these reflected vibrations would add to the reflections from the deeper formations or give the appearance of more reflecting horizons than are actually present. The preferred location of explosive charge 15 can be determined from a general knowledge of the velocity transmission properties of bed 13 and from the frequency of vibrations of interest. For most seismic work the highest frequency of interest is approximately eighty cycles per second. If the velocity of vibration transmission in bed 13 is approximately 8,000 feet per second, which can be accepted as a general average for many locations, then the wave length of vibrations of eighty cycles per second frequency is approximately one hundred feet, this being obtained from the well known relationship that the velocity of transmision is equal to the product of the frequency and wave length. Any waves that travel upwardly from charge 15 and are reflected downwardly from the interface between beds 12 and 13 are changed in phase by 180 degrees as a result of the reflection. It is therefore desirable that charge 15 not be placed at one-half a wave length below the lower surface of bed 12 because such a position would result in the reflected wave being 180 degrees out of phase with the original waves directed downwardly. Furthermore, charge 15 should not be positioned immediately below the lower surface of bed 12 because the reflected waves would again be 180° out of phase with the original downwardly moving waves. The positioning of charge 15 at one-quarter wave length below the lower surface of layer 12 is preferred because the reflected waves are then in phase with the original downwardly directed waves. In the above example this preferred position is approximately twenty-five feet below the lower surface of bed 12. However, any position between approximately one-eighth wave length and three-eighths wave length, that is, between twelve and thirty-eight feet in the above example, is generally satisfactory.

It is generally desirable to employ charges in these deep shot holes which are of greater magnitude than the charges employed in the conventional shallow holes. Because much less undesired surface and near surface vibrations are generated by this method, the limit of the size of the charge that can be used normally depends only upon the practical consideration of keeping the shot hole from caving in. Of course, even this factor need not be considered in the last shot fired from any given hole.

Figure 3:
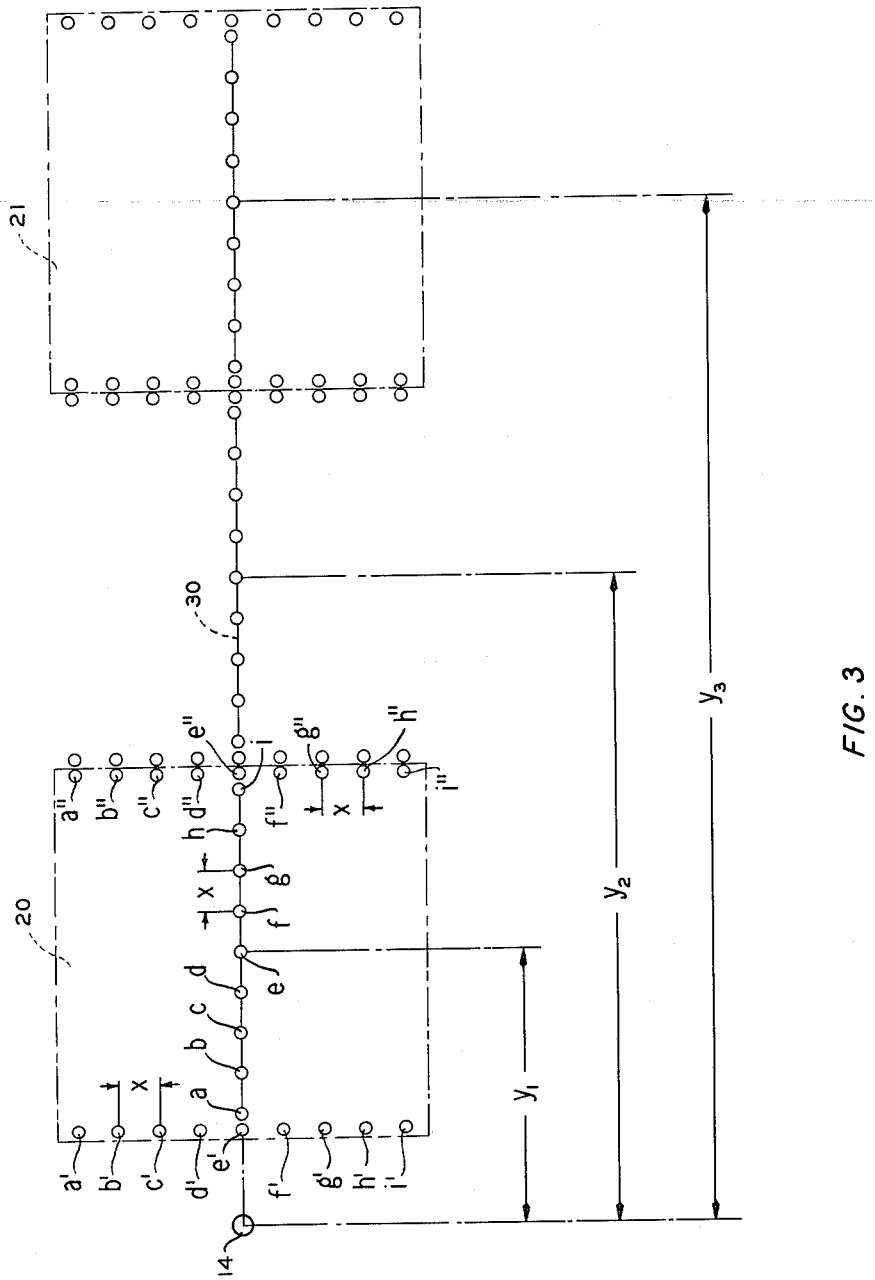
Figure 3 is a schematic representation of a particular geometric array of geophones adapted to record the reflected seismic waves.

As a specific example of the improved results obtained from the seismic prospecting method of this invention reference is made to Figure 3 which shows the geometric array of a set of geophones employed in certain exploration operations in Hutchinson County, Texas. The various groups of geophones 20–25 were positioned along a common axis 30 which intersects shot hole 14. Each of these groups of geophones included twenty-seven individual geophones arranged in the manner illustrated. Considering group 20, for example, there were nine geophones $a, b, c, d, e, f, g, h$ and $i$ arranged along axis 30 and separated from one another by a like distance $x$ which was eighteen feet. A second line of nine geophones $a', b', c', d', e', f', g', h'$ and $i'$ was positioned along a line perpendicular to axis 30, and each of the individual geophones was separated from the adjacent geophones by a distance of eighteen feet. The center geophone $e'$ was positioned on axis 30 approximately one-half foot closer to shot hole 14 than was geophone $a$. A third line of nine geophones $a'', b'', c'', d'', e'', f'', g'', h''$ and $i''$ was positioned along a second line perpendicular to axis 30 whereby geophone $e''$ was on axis 30 approximately one-half foot farther from shot hole 14 than geophone $i$. The individual geophones in this latter line also were separated from one another by a distance of eighteen feet.

The electrical connection of the individual geophones of group 20 is shown in Figure 4. These geophones were conventional vibration responsive instruments that convert vibrations incident thereon into corresponding electrical signal that vary in amplitude in accordance with the amplitude of vibrations. Geophones $a, b, c, a', b', c', a'', b''$ and $c''$ were connected in series relation between the input terminals of an amplifier 29, the output terminals of amplifier 29 being connected to the input of one channel of recorder 27. Geophones $d, e, f, d', e', f', d'', e''$ and $f''$ also were connected in series relation between the input terminals of amplifier 29 as were geophones $g, h, i, g', h', i', g'', h''$, and $i''$. The individual geophones were further connected in parallel with one another in groups as follows; $a, d$ and $g$; $b, e$ and $h$; $c, f$ and $i$; $a', d',$ and $g', b', e'$ and $h'$; $c', f'$ and $i'$; $a'', d''$ and $g''$; $b'', e''$ and $h''$; and $c'', f''$ and $i''$.

The distance $y_1$ between shot hole 14 and geophone $e$ of group 20 was 145 feet. A second group of like geophones 21 was positioned on axis 30 in the same manner as the individual geophones in group 20. The spacing between shot hole 14 and the corresponding center geophone of group 21 was 435 feet. A third group of geophones, not shown in Figure 1, was positioned between groups 20 and 21 with the corresponding center geophone in this third group being positioned 290 feet from shot hole 14. This third group has been omitted from Figure 1 in order to simplify the drawing. In addition to the three groups illustrated in Figure 3, nine other groups were positioned along axis 30 with the following spacings between shot hole 14 and the corresponding center geophone of each group: 580 feet, 725 feet, 870 feet, 1015 feet, 1160 feet, 1305 feet, 1450 feet, 1595 feet and 1740 feet. Thus, geophone groups 20–25 represent every second group of geophones actually employed. Charge 15 comprised approximately 50 pounds of dynamite and was positioned such that the center thereof was 778 feet below the surface. Charge 15 extended approximately ten feet on each side of this center point.

Figure 5B:
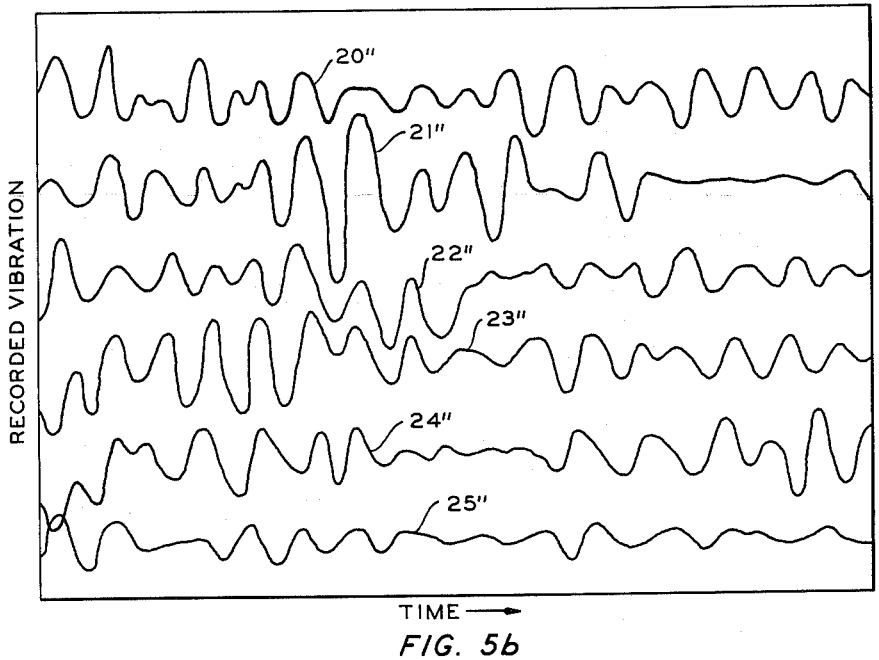
Figures 5a and 5b are reproductions of selected portions of the recorded reflected seismic waves.
Figure 5A:
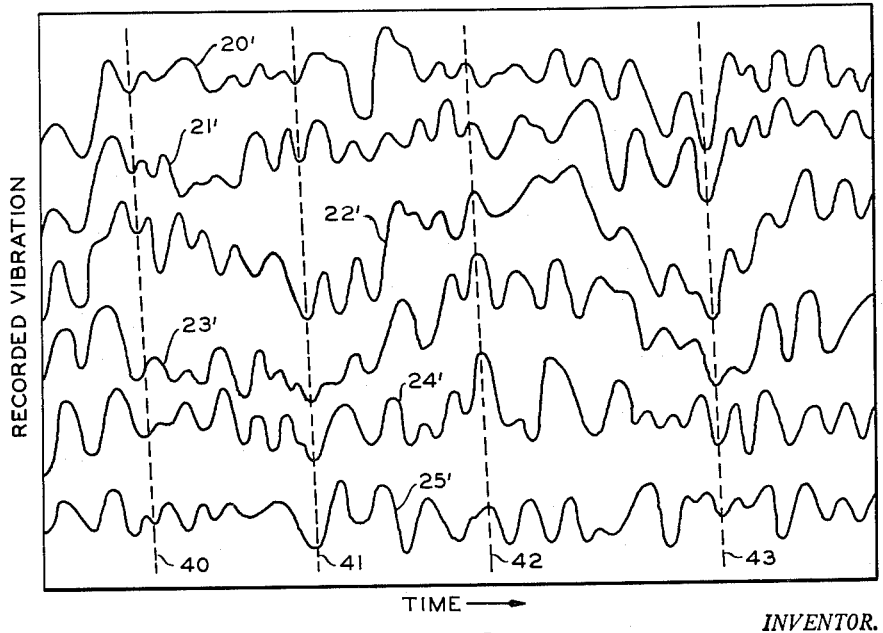

In Figure 5a there is illustrated a reproduction of a portion of the recorded vibration pattern received by the respective groups of geophones. Curves 20', 21', 22', 23', 24' and 25' correspond to vibrations received by respective geophone groups 20, 21, 22, 23, 24 and 25. The curves corresponding to the geophone groups not shown in Figure 1, which are positioned between the illustrated groups of geophones, have also been omitted from Figure 5a for simplicity of illustration. In Figure 5b there are shown vibration curves 20″, 21″, 22″, 23″, 24″ and 25″ which were obtained from a geophone array corresponding to that illustrated in Figure 3 which was positioned along an axis parallel to axis 30 and at a distance approximately 110 feet therefrom. However, in obtaining this latter record, charge 15 was positioned at a depth of only 160 feet which was not below bed 12. The explosive charge used at this latter depth comprised five pounds of dynamite. Thus, the vibration curves illustrated in Figure 5a represent the information obtained in accordance with the prospecting method of this invention wherein the explosive charge is positioned slightly beneath the lower surface of a layer having high velocity vibration transmission properties. The vibration curves illustrated in Figure 5b show corresponding information obtained in accordance with the prospecting systems generally employed heretofore. From an inspection of Figures 5a and 5b it should readily be apparent that the vibration curves of Figure 5a are decidedly superior to those shown in Figure 5b for the purpose of identifying reflecting layers in terms of the correspondence of the wave forms at characteristic intervals. Four of these reflected formations are identified in Figure 5a by the lines 40, 41, 42 and 43. No such correspondence can be observed from the curves of Figure 5b. These curves can, of course, be interpreted to identify the various earth strata by methods well known to those skilled in the art.

The particular geometric array of geophones illustrated in Figure 3 should be considered merely as an illustration of one possible configuration rather than as a limitation of the method of this invention. The invention resides in positioning an explosive charge at a depth slightly greater than the lower surface of a formation having high velocity vibration transmission properties. The particular spacing of geophones at or near the surface forms no part of the present invention and any desired configuration can be employed. Thus, while this invention has been described in conjunction with a present preferred embodiment thereof it should be obvious that the invention is not limited thereto.

What is claimed is:

1. A method of seismic prospecting in areas which are characterized by a bed of material in the earth positioned at or near the surface of the earth, which bed transmits seismic vibrations at velocities greater than the velocities of transmission in the material below said bed, which comprises positioning an explosive charge below the lower surface of said bed a distance approximately equal to one-fourth wave length of the highest frequency of seismic vibration of interest, said wave length being determined in accordance with the velocity of seismic waves in the material in which said charge is positioned, detonating said charge, and detecting the resulting seismic vibrations at preselected locations spaced from said explosive charge.

2. A method of seismic prospecting in areas which are characterized by a bed of material in the earth positioned at or near the surface of the earth, which bed transmits seismic vibrations at velocities greater than the velocities of transmission in the material below said bed, which comprises positioning an explosive charge below the lower surface of said bed a distance from approximately one-eighth to approximately three-eighths wave length of the highest frequency of seismic vibration of interest, said wave length being determined in accordance with the velocity of seismic waves in the material in which said charge is positioned, detonating said charge, and detecting the resulting seismic vibrations at preselected locations spaced from said explosive charge.

3. A method of seismic prospecting in areas which are characterized by a bed of material in the earth positioned at or near the surface of the earth, which bed transmits seismic vibrations at velocities greater than the velocities of transmission in the material below said bed, which comprises positioning an explosive charge below the lower surface of said bed a distance from approximately twelve feet to approximately thirty-eight feet, detonating said charge, and detecting the resulting seismic vibrations at preselected locations spaced from said explosive charge.

4. A method of positioning an explosive charge for seismic prospecting in areas which are characterized by a bed of material in the earth positioned at or near the surface of the earth, which bed transmits seismic vibrations at velocities greater than the velocities of transmission in the material below said bed, which comprises drilling a shot hole to a depth below the lower surface of said bed approximately equal to one-fourth wave length of the highest frequency of seismic vibration of interest, said wave length being determined in accordance with the velocity of seismic waves in the material in which said charge is positioned, and positioning an explosive charge in the bottom of said shot hole.

5. A method of positioning an explosive charge for seismic prospecting in areas which are characterized by a bed of material in the earth positioned at or near the surface of the earth, which bed transmits seismic vibrations at velocities greater than the velocities of transmission in the material below said bed, which comprises drilling a shot hole to a depth below the lower surface of said bed from approximately one-eighth to approximately three-eighths wave length of the highest frequency of seismic vibration of interest, said wave length being determined in accordance with the velocity of seismic waves in the material in which said charge is positioned, and positioning an explosive charge in the bottom of said shot hole.

6. A method of positioning an explosive charge for seismic prospecting in areas which are characterized by a bed of material in the earth positioned at or near the surface of the earth, which bed transmits seismic vibrations at velocities greater than the velocities of transmission in the material below said bed, which comprises drilling a shot hole to a depth from approximately twelve feet to approximately thirty-eight feet below the lower surface of said bed, and positioning an explosive charge in the bottom of said shot hole.

References Cited in the file of this patent

UNITED STATES PATENTS

| | | |
|---|---|---|
| 1,724,720 | McCollum | Aug. 13, 1929 |
| 1,978,668 | Burg | Oct. 30, 1934 |
| 2,654,874 | Press | Oct. 6, 1953 |
| 2,718,928 | Weiss | Sept. 27, 1955 |